United States Patent [19]

Shiraki et al.

[11] Patent Number: 4,499,420
[45] Date of Patent: Feb. 12, 1985

[54] DISK TYPE MOTOR SPEED DETECTING DEVICE

[75] Inventors: Manabu Shiraki; Akihiro Nakajima; Takashi Miyazawa, all of Tokyo, Japan

[73] Assignee: Sinano Denki Kabushiki Kaisha, Japan

[21] Appl. No.: 345,420

[22] Filed: Feb. 3, 1982

[30] Foreign Application Priority Data

Mar. 5, 1981 [JP] Japan .................................. 56-30524

[51] Int. Cl.³ ............................ G01P 3/48; G01P 3/54
[52] U.S. Cl. ....................................... 324/174; 310/156
[58] Field of Search ................ 324/174; 310/156, 168; 318/309; 73/519

[56] References Cited

FOREIGN PATENT DOCUMENTS

| 89912 | 8/1978 | Japan | 310/156 |
| 2390 | 1/1980 | Japan | 310/156 |
| 74349 | 6/1980 | Japan | 310/156 |
| 212619 | 3/1924 | United Kingdom | 310/156 |
| 621202 | 4/1949 | United Kingdom | 310/156 |

OTHER PUBLICATIONS

Kuntzleman, Magnetic Emitter, IBM Technical Disclosure Bulletin, Dec. 1958, p. 41.

Primary Examiner—Stanley T. Krawczewicz
Attorney, Agent, or Firm—Kane, Dalsimer, Kane, Sullivan and Kurucz

[57] ABSTRACT

A disk type motor speed detecting device is made up of a doughnut shaped plate high in magnetic permeability secured to the inner surface of the lower plate of the body, a coil wound on a small portion of the doughnut shaped plate; a doughnut shaped magnet with S and N poles one of which has a magnetization angle of more than 180°, a disk-shaped yoke secured to the magnet, and a rotary shaft adapted to rotate the magnet relative to the doughnut shaped plate.

4 Claims, 19 Drawing Figures

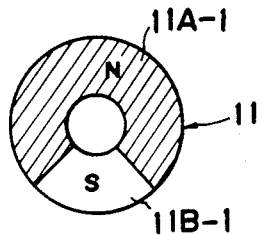
FIG. 6(a)
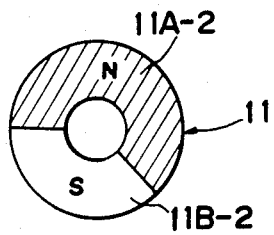
FIG. 6(b)
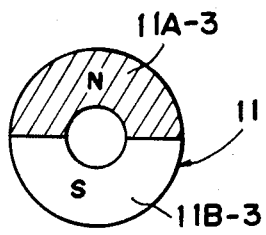
FIG. 6(c)
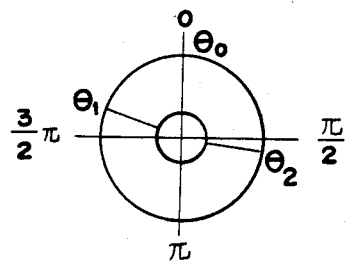
FIG. 7
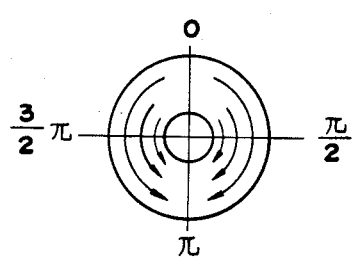
FIG. 8
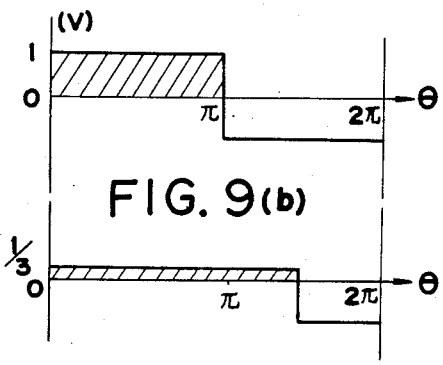
FIG. 9(a)
FIG. 9(b)

4,499,420

DISK TYPE MOTOR SPEED DETECTING DEVICE

BACKGROUND OF THE INVENTION

This invention relates to a device for detecting the speed of an electric motor such as a stepping motor.

While ordinary electric motors make at least one revolution, some of the special motors are turned, for instance, through 150° smaller than 360° (one revolution) at a time. Thus, the speed of a special motor of this type is detected in correspondence to the rotation range of 150°. A tachometer generator commercially available may be used to detect the speed of the special motor as it is; however, it is disadvantageous in that it is expensive and a device using a special motor unavoidably become expensive and bulky.

A variety of motor speed detecting devices of generator type have been proposed for special motors. However, the conventional devices suffer from drawbacks that the manufacturing process is intricate and therefore the devices are expensive, and that the range in which a speed detection signal is produced is small, and the speed detection signal is not constant; i.e., the devices are low in performance.

SUMMARY OF THE INVENTION

Accordingly, an object of this invention is to eliminate the above-described difficulties accompanying a conventional motor speed detecting device. More specifically, an object of the invention is to provide a disk type motor speed detecting device which can be readily manufactured at low cost, and in which the range in which a motor speed detection signal can be produced is large.

The foregoing object and other objects of the invention have been achieved by the provision of a disk type motor speed detecting device which, according to the invention, comprises: a motor speed detecting device body having upper and lower plates; a doughnut shaped plate made of a material high in magnetic permeability secured to the inner surface of the lower plate; a coil which is wound on a portion of the doughnut shaped plate in troidal manner; a doughnut shaped magnet confronted with the doughnut shaped plate with a relatively small space therebetween, the doughnut shaped magnet having S and N poles one of which has a magnetization angle of more than 180°; a disk-shaped yoke which is fixedly placed on the upper surface of the doughnut shaped magnet, the yoke being made of a material high in magnetic permeability; and a rotary shaft which penetrates a substantially central portion of the magnet and is rotatably supported by the upper and lower plates of the body.

The principle, nature and utility of the invention will become more apparent from the following detailed description when read in conjunction with the accompanying drawings.

BRIEF DESCRIPTION OF THE DRAWINGS

In the accompanying drawings:

FIGS. 6(a) through 6(c) are plan views showing examples of a doughnut shaped magnet;

FIG. 7 is a plan view of the doughnut shaped magnet for analyzing the magnetic flux distribution in the doughnut shaped iron plate;

FIG. 8 is an explanatory diagram showing the magnetic flux distribution in the doughnut shaped iron plate;

FIGS. 9(a) and (b) are diagrams showing the theoretical output waveforms which are provided when the magnets shown in FIGS. 6(a) and 6(c) are employed, respectively;

DETAILED DESCRIPTION OF THE INVENTION

Figure 1:
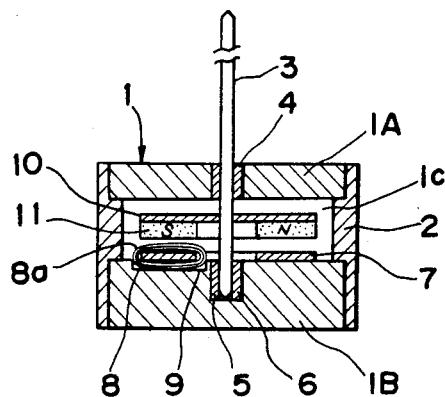
FIG. 1 is a sectional view showing one example of a disk type motor speed detecting device according to this invention.

One example of a disk type motor speed detecting device according to this invention, as shown in FIG. 1, comprises a disk type motor speed detecting device body 1 which is made up of a disk-shaped upper plate 1A and a disk-shaped lower plate 1B which are supported by a support 2 in such a manner that there is a space 1C between the plates 1A and 1B. The plates 1A and 1B are made of synthetic resin.

A rotary shaft 3 is inserted into the plates 1A and 1B in such a manner that it is perpendicular to the plates 1A and 1B and is freely rotatable. The rotary shaft 3 is coupled to the rotary shaft of a motor (not shown) such as a stepping motor, to detect the speed of the motor.

The device further comprises oil-less metal bearings 4 and 5 which are inserted into the upper and lower plates 1A and 1B, respectively, and fitted on the rotary shaft 3, so as to facilitate the rotation of the rotary shaft 3 and to rotatably support the latter 3. It should be noted that the metal bearing 5 is inserted into a circular recess 6 formed in the lower plate 1B.

Figure 2:
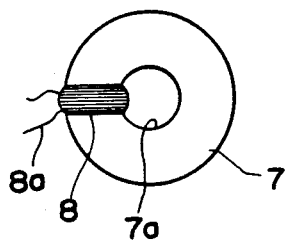
FIG. 2 is a plan view showing a doughnut shaped iron plate on a portion of which a coil is wound in toroidal manner.

A doughnut shaped plate 7 is fixedly bonded to the inner surface of the lower plate 1B with adhesive for instance. The doughnut shaped plate 7 is made of material high in magnetic permeability. In the example, the doughnut shaped plate 7 is made of iron which is relatively low in cost, and it will be hereinafter referred to as "a doughnut shaped iron plate 7" when applicable. The doughnut shaped is 2 mm in thickness and 30 mm in outside diameter, and has a circular hole 10 mm in diameter, for instance. A coil 8 is wound around a portion of the doughnut shaped iron plate 7 in toroidal manner as shown in FIG. 2. It goes without saying that an insulation tape or the like is interposed between the coil 8 and the iron plate 7. The coil 8 has terminals 8a across which an output voltage is developed.

As shown in FIG. 1, a recess 9 is formed in the inner surface of the lower plate 1B so that the coil 8 wound on the doughnut shaped iron plate can be positively received thereby.

Figure 3:
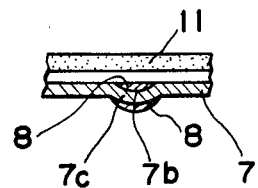
FIG. 3 is a sectional view showing a part of one modification of the doughnut shaped iron plate.

The doughnut shaped iron plate 7 may be modified as shown in FIG. 3, so that the gap between the doughnut shaped iron plate 7 and a magnet (described later) is reduced to improve the effeciency of the device. The one portion of the iron plate 7, on which the coil 8 is wound, is bent downwardly in FIG. 3, for instance, with a press to form a bent portion 7b. If the coil 8 is wound on the bent portion 7b thus formed, then the coil 8 is received by the indent which is provided by the bent portion 7b. That is, the coil 8 is not protruded toward the magnet from the surface of the doughnut shaped iron plate 7, and accordingly the gap between the magnet and the iron plate 7 can be reduced as much. The bent portion and the coil wound thereon can be preferably placed in the recess 9 of the lower plate 1B.

Figure 4:
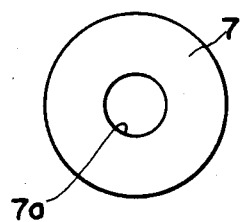
FIG. 4 is a plan view showing the doughnut shaped iron plate.
Figure 5:
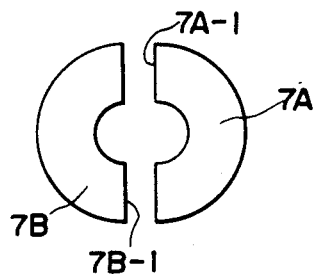
FIG. 5 is a plan view showing two segments which form the doughnut shaped iron plate.

It is generally troublesome to wind the coil on the doughnut shaped iron plate 7 as shown in FIG. 2. In order to eliminate this difficulty, the iron plate 7 may be divided into two parts, namely, semi-circular segments 7A and 7B as shown in FIG. 5. In this case, the coil 8 may be formed with a suitable jib and then put on the segment 7A or 7B. Then, the segments 7A and 7B are joined together as shown in FIG. 4. Thus, the doughnut shaped iron plate 7 with the coil 8 can be readily obtained. The end faces 7A-1 and 7B-1 of the segments should be subjected to mirror polishing. The segments shown in FIG. 5 are semicircular; however, the configuration of the segments is not limited thereto or thereby. That is, the segments may have any configuration if they can form the doughnut shaped iron plate 7 as shown in FIG. 4.

Referring back to FIG. 1, reference numeral 10 designates a disk-shaped yoke made of material high in magnetic permeability. The yoke 10 is fixedly mounted on the rotary shaft 3 at the center in such a manner that it is perpendicular to the rotary shaft 3. The yoke 10 is 1 mm in thickness for instance, and has the same diameter as the doughnut shaped iron plate 7. A doughnut shaped magnet 11 is bonded to the lower surface of the yoke 10 with adhesive. The magnet 11, as shown in FIGS. 6(a), 6(b) and 6(c) has two magnetic poles (S and N poles). One of the magnetic poles (the N pole in the case of FIG. 6) has a magnetic pole width of at least 180°. The magnet is a ferrite magnet for instance.

As the rotary shaft 3 is rotated, the yoke 10 and the magnet 11 are rotated relative to the doughnut shaped iron plate 7. A voltage corresponding to the rotation is developed across the terminals 8a of the coil 8. As the rotary shaft 3 is coupled to the output shaft of a motor (not shown) under measurement, the speed of the motor can be determined by measuring the output voltage of the coil 8.

The doughnut shaped magnet 11 is such that the N and S poles have magnetic pole widths of 270° and 90° in FIG. 6(a), respectively; magnetic pole widths of 225° and 135° in FIG. 6(b), respectively; and magnetic pole widths of 180° and 180° in FIG. 6(c), respectively. However, it is considerably difficult to magnetize a magnet material in the manufacturing process so that the magnet has magnetic pole widths as described above. This difficulty may be eliminated by employing a method in which the doughnut shaped magnet 11 is constituted by two magnet segments 11A-1 and 11B-1, 11A-2 and 11B-2 or 11A-3 or 11B-3 which are formed and magnetized as shown in FIGS. 6(a), 6(b) or 6(c).

The device of the invention, being constructed as described above, may be called a generator system disk type motor speed detecting device. The principle of the device of generator system will be described. If the distribution of magnetic flux directed from the magnet 11 toward the doughnut shaped iron plate 7 is represented by f($\theta$), then $$f(\theta) = f(0 + 2n\pi) \tag{1}$$

where $n = 0 \pm 1 \pm 2$

Thus, f($\theta$) is a period function, and the period is $2\pi$. If the magnetic circuit of the magnet 11 and the iron plate 7, then the following expression can be held:

$$\int_0^{2\pi} f(\theta) \, d\theta = 0 \tag{2}$$

Let us investigate the waveform of electricity generated by the disk type generator (as shown in FIG. 1) with the magnet 11 having two poles. The magnetic flux distribution in the doughnut shaped iron plate 7 is:

$$\phi(\theta) = \int_0^{\theta} f(\theta) d\theta \tag{3}$$

In order to simplify the analysis, the original point is selected according to FIG. 7. If it is assumed that the S pole is shifted to the N pole at $\theta_1$, and the N pole is shifted to the S pole at $\theta_2$, then $$\int_{\theta_1}^{\theta_2} f(\theta) d\theta = A \text{ (where } A \text{ is the integration value)}$$

$$\int_{\theta_1}^{\theta_3} f(\theta) d\theta = A/2$$

where
$$\theta_1 < \theta_3 < \theta_2 \tag{4}$$

The original point is selected at the value $\theta_3$ which is obtained from the expression (4). Therefore, the magnetic flux distribution in the doughnut shaped iron plate 7 is as shown in FIG. 8, and $\phi(\theta)$. By using $\phi(\theta) = 0$, the expression (3) can be rewritten as follows:

$$\phi(\theta) = \int_0^{\theta} f(\theta) d\theta = [F(\theta)]_0^{\theta} = F(\theta) - F(0) = F(\theta)$$

Let us consider the waveform of electricity generated when the doughnut shaped magnet 11 is turned at an angular velocity $\omega$ with the coil 8 wound on the doughnut shaped iron plate 7.

$$E = -d\phi/dt$$

(where E is the generated voltage which is induced by the variation of magentic flux)

$$\theta = \omega t, \, d\theta/dt = \omega, \text{ and } d\theta = \omega dt$$

Therefore, $$E(t) = -d/dt \cdot \phi(t) = -d/dt \cdot \int_0^\theta f(t) \cdot \omega dt \quad (5)$$

$$= -\omega f(t)$$

From (5)

$$E(\theta) = -f(\theta) \quad (6)$$

Thus, the waveform of electricity generated by the disk type generator (shown in FIG. 1) can be obtained, as a function of $\theta$, from the expression (6), and is similar to the magnetic flux distribution $f(\theta)$ extended from the doughnut shaped magnet 11 towards the doughnut shaped iron plate 7. As is apparent from the expression (5), the generated voltage (developed across the coil terminals 8a) is proportional to the angular velocity $\omega$, with the assumption that the doughnut shaped iron plate 7 is not magnetically saturated. The disk type motor speed detecting device bases on the principle described above. In order to satisfy the principle, the generated voltage V (across the terminals 8a) must be in proportion to the speed of rotation (or angular velocity) $\omega$. This condition is satisfied by the expression (5). That is, $V = \mu\omega$ (wherein V is the generated voltage, $\omega$ is the speed of rotation (or angular velocity), and $\mu$ is the proportional constant). It is desirable that the proportional constant $\mu$ is constant over a wide range of angles. That is, it is required that the voltage generated when the generator (shown in FIG. 1) is rotated at a constant speed is constant over a wide range of angles.

In order to use the disk type generator (FIG. 1) as a motor speed detecting device (or a speed sensor), the above-described condition as to $E(\theta)$ must be satisfied. The power generation characteristic of the generator (FIG. 1) is $E(\theta) = -f(\theta)$ (6). Therefore, the N and S poles should be formed in the doughnut shaped magnet 11 so that $-f(\theta)$ meets the above-described condition. Output waveforms which are obtained when the doughnut shaped magnets 11 as shown in FIGS. 6(a) and 6(b) are used, are as shown in FIGS. 9(a) and 9(b), respectively. As is clear from FIGS. 9(a) and 9(b), in the case where the generator shown in FIG. 1 is used as a motor speed detecting means, the output is decreased as the angle is increased. However, even if the output voltage is decreased, the use of the magnet with which the generated voltage is constant over a wider range of angles is suitable as the motor speed detecting means, because the motor speed detection range is increased as much. The output voltage can be increased by various methods: in the case where the doughnut shaped magnet 11 is a rubber magnet, it should be replaced by a ferrite magnet; in the case where it is a ferrite magnet, it should be replaced by a samarium rare earth magnet; and the electrical curcuit is slightly modified. Thus, the output voltage can be readily increased.

Figure 10:
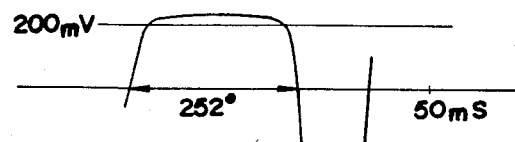
FIGS. 10(a) through 10(c) are graphical representations showing the output waveforms which are provided when the magnets shown in FIGS. 6(a) through 6(c) are employed, respectively.
Figure 10:
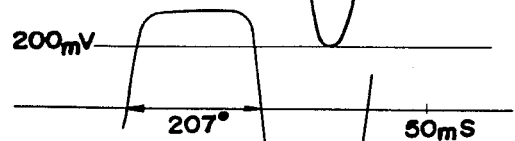
Figure 10:
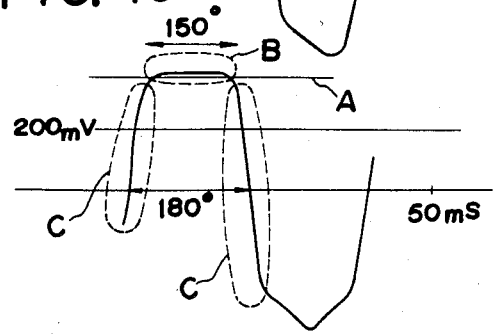

The disk type motor speed detecting device according to the invention is so designed as to meet the above-described condition. When a motor (not shown) under test is rotated, the rotary shaft 3 coupled to the output shaft of the motor is rotated; that is, the doughnut shaped magnet 11 is rotated relative to the doughnut shaped iron plate 7 and the coil 8. A voltage corresponding to the speed of the motor is developed across the terminals 8a of the coil 8. The output waveforms which are obtained when the doughnut shaped magnets 11 as shown in FIGS. 6(a), 6(b) and 6(c) are used, are as indicated in FIGS. 10(a), 10(b) and 10(c), respectively. As is apparent from FIG. 10(c), (a) the N pole is gradually shifted to the S pole; that is, the shifting occurs over an angle. For instance, even in the case where the magnet has the N and S poles each occupying 180°, the angle for which the magnetic flux is constant is only about 150°. (b) Even if the doughnut shaped magnet 11 is magnetized so that constant magnetic flux is obtained, in practice it is impossible to obtain a completely linear voltage; in other words, a part B (surrounded by the dotted line in FIG. 10(c)) of the waveform is not in parallel with the line A. (c) The output may be increased by increasing the number of turns of the coil 8. However, in this case, it is impossible to provide the coil 8 at one point (very small region) of the iron plate 7; and accordingly the expression (5) $E(t) = -\omega f(t)$ cannot be held. However, if the winding angle of the coil 8 is small, then the expression (5) can be established approximately. The phenomena described in (a) and (c) acts to decrease the linear parts of the output voltage (which is a part B (surrounded by the dotted line in FIG. 10(c)) of the output waveform which is extended along or in parallel with the line A, and parts C other than the part B. On the other hand, the phenomenon described in (b) acts as noise to make the putput waveform irregular.

Figure 11:
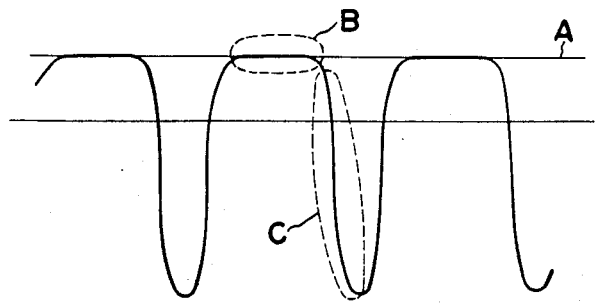
FIG. 11 is a graphical representation showing the output waveform which is provided when the doughnut shaped magnet shown in FIG. 6(a) is used.
Figure 12:
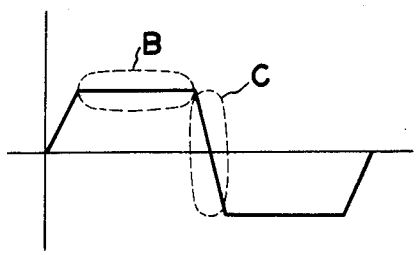
FIG. 12 is a graphical representation showing a theoretical output waveform in the invention.

An experiment was carried out with the generator having the magnet as shown in FIG. 6(a) (the N pole covering 270°). The resultant output waveform is as shown in FIG. 11. In the experiment, at 1550 r.p.m. the output voltage was 240 mV, the output waveform was of about 200°, and the ripple voltage was 30 mV. As is apparent from FIG. 11, the part B (surrounded by the dotted line) is extended along the line A. Thus, it can be understood that the angle corresponding to the part in which the generated voltage is constant was increased. That is, the disk type motor speed detecting device of the invention can provide an output waveform as shown in FIG. 12. The speed of a motor (not shown) under test can be detected by the above-described part B of the output waveform (which is the range from which a motor speed detection signal can be obtained). A motor speed detecting device in which the part B surrounded by the dotted line (which is the range from which the motor speed detection signal can be obtained) corresponds to at least 150°.

The part C of the output waveform is not linear, because it is affected by the magnetic forces of the N and S poles. Thus, even if the magnet 11 is designed so that each of the N and S poles covers 180° as shown in FIG. 6(c), the angle corresponding to the part C of the waveform is not more than about 140°. Therefore, if it is intended to provide a motor speed detecting device for a special motor, in which the angle corresponding to the part C is 150°, then the magnetization angle of one of the N and S poles must be more than 180°.

Figure 13:
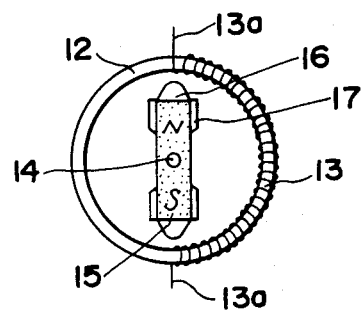
FIG. 13 is an explanatory diagram showing a conventional motor speed detecting device.
Figure 14:
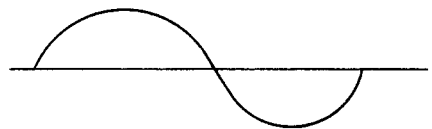
FIG. 14 is a graphical representation showing the output waveform of the device in FIG. 13.

For the same object as that of the invention, a technique has been proposed in United States for a special motor which turns only within 150°, in order to detect the speed of rotation within 150°. A motor speed detecting device according to the technique is as shown in FIG. 13. The device is of generator type, similarly as in this invention. A coil 13 is wound on a cylindrical iron ring 12 in toroidal manner with a range of 180° as shown in FIG. 13. A generated voltage is developed across both terminals 13a of the coil 13. A rectangular magnet 15 mounted on a rotary shaft 14 is rotatably supported in the cylindrical iron ring 12. Iron protrusions 16 are secured to both end faces of the magnet 15, so that the magnetic flux is extended collectively in the direction of the arrow. In order to facilitate the extension of the magnetic flux, insulating members 17 made of material such as copper which is low in magnetic permeability and is adapted to convert magnetism into current are attached to the sides of the rectangular magnet 15 near the iron protrusions 16. The motor speed detecting device of generator type meets the above-described condition. Even if the iron protrusions 16 and the insulating members 17 are attached to the magnet 15 as described above, the magnetic force diverges in many directions, and therefore the resultant output waveform is sinusoidal as shown in FIG. 14. Thus, the device is not suitable as the motor speed detecting device in which it is essential that a generated voltage is constant over a wide range of angles. Even if the coil 13 is wound over a range of 180° in the conventional device, the motor speed detection range theoretically cannot be increased to more than 150°. Therefore, if a special motor is one which rotates through more than 150°, then the device shown in FIG. 13 cannot achieve speed detection in a range of more than 150°. This may be achieved by winding the coil 13 in the form of many coil layers on the iron ring 12; however, the winding operation is rather difficult and the coil layers must be insulated from one another, which results in an increase of the manufacturing cost. These difficulties have been eliminated by the provision of the motor speed detecting device of the invention which has been described with reference to FIGS. 1 through 12.

As is apparent from the above description, the invention has the following effects or merits:

(a) As the range of angles for obtaining the detection signal can be freely set to 150° to 220° depending on the magnetization angle of the magnet, the device can be applied to a variety of special motors.

(b) As shown in FIG. 12, the output waveform is not sinusoidal, and the range of angles in which the generated voltage is constant is large as indicated at C. Therefore, the speed of a motor can be detected with high accuracy.

(c) As is clear from the expression (5), the generated voltage is proportional to the angular velocity $\omega$ from low speed to high speed.

(d) Even in a small angle operation, the signal according to the expression (5) can be directly obtained.

(e) The number of components is relatively small. Therefore, the device can be readily manufactured at low cost.

(f) As the doughnut shaped iron plate is composed of two segments, the coil can be readily wound thereon.

(g) The doughnut shaped iron plate has the bent portion as shown in FIG. 3, and the recess is formed in the lower plate in correspondence to the bent portion. Therefore, the gap between the doughnut shaped iron plate and the magnet can be reduced as much, which improves the performance of the device.

(h) The doughnut shaped magnet is composed of two segments. Therefore, a number of doughnut shaped magnets having suitable magnetization angles can be manufactured quickly at low cost.

What is claimed is:

1. A disk type motor speed detecting device comprising:
    a motor speed detecting device body having upper and lower plates;
    a doughnut shaped plate made of a material high in magnetic permeability secured to the inner surface of said lower plate;
    a coil which is wound on a portion of said doughnut shaped plate in toroidal manner;
    a doughnut shaped magnet confronted with said doughnut shaped plate with a relatively small space therebetween, said doughnut shaped magnet having angular S and N poles one of which has a magnetization angle of more than 180°;
    a disk-shaped yoke which is fixedly placed on the upper surface of said doughnut shaped magnet, said disk-shaped yoke being made of a material high in magnetic permeability; and
    a rotary shaft which penetrates a substantially central portion of said doughnut shaped magnet and is rotatably supported by said upper and lower plates of said body.

2. A device as claimed in claim 1, in which said doughnut shaped plate is made up of at least two segments.

3. A device as claimed in claim 1, in which said doughnut shaped plate has a portion bent downwardly on which said coil is wound.

4. A device as claimed in claim 1, in which said doughnut shaped magnet is madeup of two segments which are magnetized into S and N poles, respectively.

* * * * *